United States Patent [19]
Edgar

[11] Patent Number: 5,191,413
[45] Date of Patent: Mar. 2, 1993

[54] SYSTEM AND METHOD FOR ELIMINATING INTERLACE MOTION ARTIFACTS IN CAPTURED DIGITAL VIDEO DATA

[75] Inventor: Albert D. Edgar, Austin, Tex.

[73] Assignee: International Business Machines, Armonk, N.Y.

[21] Appl. No.: 608,107

[22] Filed: Nov. 1, 1990

[51] Int. Cl.$^5$ .............................................. H04N 7/18
[52] U.S. Cl. ..................................... 358/105; 358/167
[58] Field of Search ............... 358/105, 136, 140, 167

[56] References Cited

U.S. PATENT DOCUMENTS

| | | | |
|---|---|---|---|
| 4,383,272 | 5/1983 | Netravali et al. | 358/105 X |
| 4,546,386 | 10/1985 | Matsumoto et al. | 358/105 X |
| 4,740,842 | 4/1988 | Annegarn et al. | 358/140 X |
| 4,760,446 | 7/1989 | Ninomiya et al. | 358/105 |
| 4,768,092 | 8/1988 | Ishikawa | 358/105 X |
| 4,845,557 | 7/1989 | Lang | 358/105 |
| 4,891,699 | 1/1990 | Hamada et al. | 358/105 X |
| 4,924,305 | 5/1990 | Nakagawa et al. | 358/105 |
| 4,967,271 | 10/1990 | Campbell et al. | 358/105 |
| 4,987,489 | 1/1991 | Hurley et al. | 358/105 |
| 5,019,908 | 5/1991 | Su | 358/167 X |

Primary Examiner—Victor R. Kostak
Attorney, Agent, or Firm—Robert M. Carwell

[57] ABSTRACT

Analog video data input is received by a video display adapter of a digital video capture system. Most of the resolution of the captured full interlaced image is retained while eliminating the image shake of fast moving components. A first and second sequential field comprising a full frame of video data are captured and digitized. These fields are then processed to determine areas corrupted by fast movement of components of the image which were captured. In the areas of detected fast movement, an estimate for pels is substituted in one field based upon the other field. Resolution loss is thereby confined to small areas which, due to rapid motion, were not well defined prior to processing.

4 Claims, 3 Drawing Sheets

SYSTEM AND METHOD FOR ELIMINATING INTERLACE MOTION ARTIFACTS IN CAPTURED DIGITAL VIDEO DATA

TECHNICAL FIELD

This invention relates to image capture and display systems, and more particularly, relates to computer controlled systems for enhancing digitized video images.

BACKGROUND ART

In digital video technology, systems have long been provided for capturing or digitizing analog still images in various formats such as composite video or RGB. Such capturing may typically take the form of a live capture in which the image is fully digitized as it is received, and a second category wherein the capturing process is distributed over time and may include components derived from several frames of video data.

An example of the latter is sequential RGB capture, the disadvantage of this latter category being that in order to avoid blurred images, the target must remain relatively stationary during capture. However, the problem presents itself of generating unintentional motion video even for live capture of a relatively still image from an interlaced video signal. In interlace video which is conventional in video technology, a single image or frame is actually composed of two images, or fields taken 1/60 second apart, for example. The first image might contain even numbered scan lines with the second image being odd numbered scan lines inserted or interlaced between the even scan lines after display of the first image, much like the interlacing which occurs in the shuffling of a deck of cards. An example of this interlace form of scanning may be found in conventional broadcast television raster scan images.

As aforementioned, a problem occurs with a non stationary target presented to the capture camera wherein these two fields adjacent in time are captured—even when the sequential capturing occurs 1/60th of a second apart. As a practical example, if a subject were to move a hand during the capturing process, sequential fields will be generated which will capture the hand in two distinctly different positions. However, operation of typical interlace systems call for the two fields to be continuously refreshed alternately on the display screen. The result of this may be the appearance of the hand engaged in a jittering or shaking motion at the frequency of 30 times a second giving rise to highly undesirable images.

In an effort to avoid this problem systems were developed which discarded all the scan lines associated with one of the alternating fields. The obvious undesirable result of this was of course a substantial decrease in resolution of the image, an example of which may be readily seen with respect to consumer video cassette recorders. Most such video tape players include a freeze frame mode. Due to mechanical limitations on video heads and the like, this mode displays a single field of 240 scan lines, which is only half of the 480 scan line frame attributed to consumer video. This is perceived by the view or as a substantial reduction in image quality from the full resolution image on the videotape prior to freeze frame playback.

For all of the foregoing and other reasons, a system and method was highly desired for providing an enhancement to video image capture and display systems which could eliminate motion artifacts such as undesirable image shaking of fast moving components and the like from the captured image while at the same time retaining most of the resolution of the full interlaced image.

SUMMARY OF THE INVENTION

A system and method are disclosed for providing digitized video images of captured analog video data which eliminates motion artifacts in the live capture while substantially retaining the resolution of the original interlaced image. First a still image from an interlaced video source is captured or digitized employing any of a number of commercially available video digitizing systems. This capturing includes in a preferred embodiment a first and second sequential field which comprise a full frame. These fields are then processed digitally so as to determine areas corrupted by relative motion of the target. In these areas of pels wherein such motion is detected, substitution of pel values in one field is made based upon estimates derived from pels in the remaining field.

In the preferred embodiment, in order to first identify the areas of motion shaking, interfield differences extending vertically and coherently over several pels which are also larger than intrafield detail in that area are scanned for by a digital processor. In the areas of detected motion only one field, herein referred to as the first or even field will contain pels unaltered from their original capture state. With respect to the remaining second or odd field, an operator modifies each of the pels in this odd field in accordance with the invention.

BRIEF DESCRIPTION OF THE DRAWINGS

The novel features believed to be characteristics of the invention are set forth in the appended claims. The invention itself, however, as well as other features and advantages thereof, will be best understood by reference to the following description of the preferred embodiment, when read in conjunction with the accompanying figures, wherein:

DETAILED DESCRIPTION OF THE PREFERRED EMBODIMENT

Figure 1:
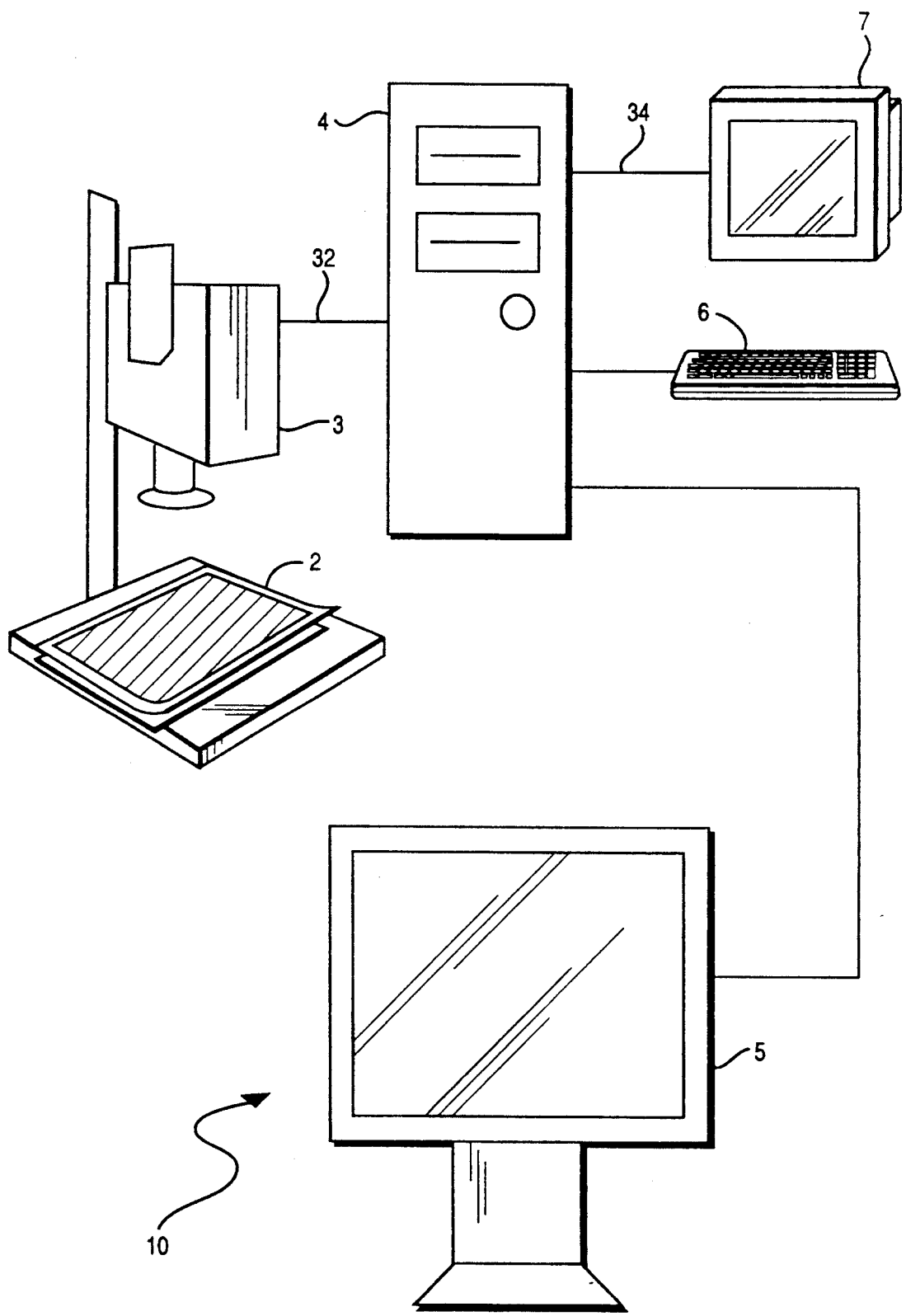
FIG. 1 is a functional block diagram depicting a computerized video image capture and processing system.
Figure 2:
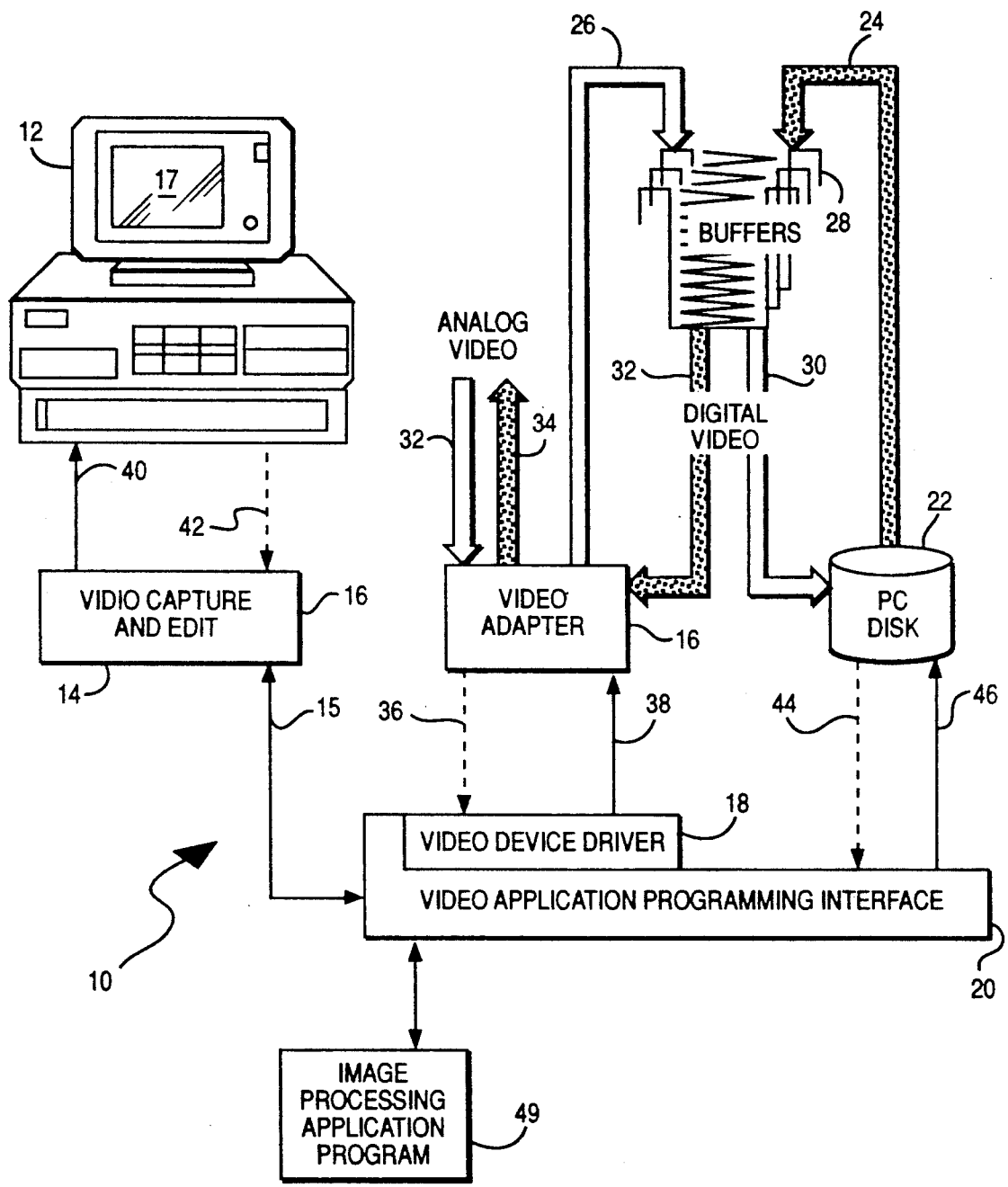
FIG. 2 is a more detailed block diagram of the system of FIG. 1.

First a high level description will be given of a representative system for capture, digitizing, processing, and display of a video image with reference to FIGS. 1 and 2. This will be followed by a detailed description of the system and method of the invention employed in the system of FIGS. 1 and 2 for interacting with the video data captured and stored in the system so as to effect the desired interlace motion artifact elimination. One such system which may be employed in the manner depicted in FIGS. 1 and 2 is the Audio Visual Connection or AVC system which includes both the hardware and software necessary for the aforementioned capture, processing, and display of video data manufactured by the IBM Corporation of Armonk. New York. Supporting documentation for such a system may be found in the following publications which are herein incorporated by reference: IBM Audio Visual Connection User's Guide and Video Capture Adapter Installation and Technical Reference Manual.

With reference now to the figures and in particular with reference to FIG. 1, there is depicted therein in block diagram form a digital computer system 10 which may be employed in accordance with the system and method of the present invention. As may be seen, system 10 may preferably take the form of a digital personal computer and includes a keyboard 6 for providing user input which is coupled to a central processing unit or host PC 4 in a manner well known in the art. Included in the host 4 are memory devices, which may comprise both volatile and non-volatile memory storage devices and which may include auxiliary memory devices such as magnetic disk or tape storage.

Host 4 is also coupled to one or more display drivers (not shown) which are utilized, in a manner well known in the art, to provide a visual display of video images by coupling appropriate control and data signals from the host 4 to the display 5 and one or more monitors 7. Those skilled in the art will appreciate that the display 5 and monitor 7 may be comprised of a variety of devices such as those adapted to receive analog video in varying formats such as RGB, Y/C, NTSC, PAL and the like.

In the system 10 shown in FIG. 1, a video camera 3 is further included having an analog video link 32 to the host 4. The camera 3 is shown to be trained on an object 2 having visual images to be digitized by the system 10. Although for convenience the object 2 is shown as stationary, it will be appreciated that to gain a maximum benefit of the subject invention as disclosed herein, this object may more preferably take the form of a moving subject such as a human, vehicle, or the like. The image of which when captured gives rise to the blurring effect addressed by the invention. In a manner to be hereinafter described, the camera 3 will transfer the visual image of object 2 into analog electronic signals carried on the link 32 to the host 4 wherein they will subsequently be digitized, processed and reconverted into analog form for output on analog output link 34 after which they are displayed on one or more monitors 7. The system 10 may, of course, include other components and as to the general digital computer and display portions, the system may preferably be implemented by means of an IBM Model No. 80 PS/2. computer manufactured by International Business Machines Corporation of Armonk, New York.

The host 4, as is common in personal computers, includes a bus system facilitating data, control, and address I/O to various components of the system in a manner well known in the art. In particular with respect to the aforementioned Model 80 host 4, a proprietary Micro Channel ™ bus system is employed which is desired in a preferred embodiment of the system 10[1]. However, the invention is not intended to be so limited to a particular bus structure and contemplates use with other bus structures. More detailed information regarding this microchannel bus structure and operation may be obtained with reference to the technical manuals accompanying the Model 80 machine which is incorporated herein by reference.

Micro Channel is a trademark of the International Business Machines Corporation

Also with respect to the system 10 depicted in FIG. 1. although analog video input signals on link 32 have been shown as originating from the camera 3, it will be readily appreciated that such analog video source material may be generated from a number of other sources such as the familiar VCR or VTR (video tape recorder), or the like and accordingly the invention is not intended to be limited to use with any particular source for generating such analog signals. As is well known in the art, these sources of analog video signals may be in a number of formats such as the aforementioned RGB, Y/C, composite video, digital, or other formats. Although only one source of such formatted video information is shown in FIG. 1, it is well known of the invention to accommodate a plurality of multiformat sources for subsequent digitizing in the host 4 of their respective video images or data, processing thereof, and subsequent re-conversion back to analog video signals for simultaneous display on one or more display devices. A computer monitor 5 has been shown in FIG. 1 which conventionally comprises a portion of a general personal computer system including the host 4 and is used for conventional purposes of I/O with the host 4. However, as hereinbefore noted, a monitor 7 has further been included for display of these re-converted analog video signals.

Referring again briefly to the bus structures associated with personal computer systems 10, it is conventional to provide in the various available hosts 4 a plurality of adapter card or expansion slots. The purpose of these slots is to enable a user to custom configure a system to perform desired functions. An adapter card in one of the slots will carry connectors for receiving raw analog video source data in multiple formats and multiplexing/control hardware and the like on the card which, under computer control by interfacing with the aforementioned bus, will select one of these signals for digitization. This adapter card will further include the analog-to-digital circuitry necessary to digitize this preselected signal. Due to interconnection of the adapter card with the bus, it will be readily appreciated that a feature of the invention is to provide for processing and editing of this thereby digitized image under control of the host 4 computer through the bus to eliminate motion artifacts in a manner to be described. A further function of the adapter card is to then re-convert the processed/edited digitized video information into analog form. such function also being performed on board on the card by provision of appropriate digital-to-analog conversion circuitry.

Finally, with respect to the preferred embodiment to be hereinafter described in greater detail, encoder circuitry is provided on the adapter card whereby when the digitized video signals are re-converted to analog form they are converted in multiple formats. Multiple connectors are provided on the card each carrying a different one of these re-converted digitized signals in a different one of the conventional analog video formats. In this manner, by connecting a monitor to each such connector adapted to receive that connector's particular signal format, simultaneous display of the video image in multiple formats results. It will be noted that this re-conversion is also under computer 4 control inasmuch as the adapter card and associated encoder circuitry is plugged into the interface bus of the computer 4.

With reference now to FIG. 2, a more detailed functional block diagram of the system 10 of FIG. 1 is illustrated which will now be described.

As shown at line 32 analog video input signals in a variety of formats are received by the video adapter 16 of the invention. The video adapter 16 is connected to the host system 12 by the video device driver 18 which receives status from the adapter on lines 36 and sends commands and data to registers of adapter 16 on line 38. The bus of the system 10 is illustrated graphically in part by output on line 26 going from adapter 16 into the video buffers 28 inside the host processor 12. Further function of this bus is illustrated by line 30 indicating information stored in this video buffer 28 may be loaded into host storage such as a PC hard disk 22. From storage 22 via the bus, again illustrated by a line, 24, data can be received from the disk and put back into the buffer 28 of host 12. From these buffers 28 data may also be read and then sent back via the host bus connection to the adapter 16 on line 32 to load video data into the video memory of the adapter 16.

A video device driver 18 has a video application programming interface 20 which directly interfaces as shown by line 15 with the video capture and edit capability or function 14 of the host system 10. The application programming interface 20 provides microcommands for the video capture and edit process that are ultimately delivered to the video adapter 16 via the device driver box 18. As a result of execution of the video capture and edit program 14 commands are sent via lines 40 to and status information is received via lines 42 from the system processor of host 12. This results in an image being displayed on the screen of one or more monitors 7, FIG. 1. The screen 17 of host 12 will generally be reserved for display of non-source material, i.e., the more conventional I/O data associated with personal computer systems. Such data includes operator input from keyboard 6, and user-interface information from the host 12 for operating the capture and display features of the invention. The displayed image may be live or a composite image including images controlled by the function selected by the video capture and edit module. The path 15 between the video capture and edit function 14 and the application programming interface 20 is via microcommands which are then in turn converted into individual separate commands and status requests across lines 36 and 38. As hereinbefore suggested functions indicated by lines 32, 30, 24 and 26 are all actually handled via the bus itself of system 10 and generally represent disk 22 I/O and adapter card 16 I/O.

It will be appreciated from the foregoing that once the image has been captured in the form of digitized representations of pels of various frames of video data by means of the system depicted in FIGS. 1 and 2, software may be provided for the host processor 12 for manipulating such data in any desired manner. It is of course a feature of the invention to provide for such a computerized process for operating on this digitized data in the desired manner in accordance with the invention. Thus an image processing application program of the invention may be provided to interface with the video application programming interface 20 so as to effect the desired manipulation and transformation of these digital representations of the pels stored in the PC disk 22 and buffers 28. These modified representations will then be restored on PC disk 22 or output through video adapter 16 as analog signal 34 for display of an enhanced image which thus had the interlace motion artifacts eliminated by the processing software interacting with the system 10.

Figure 3:
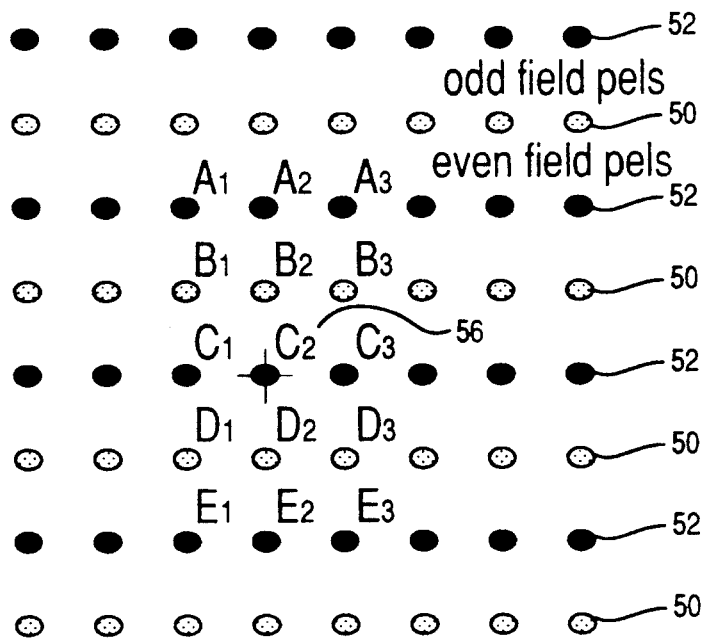
FIG. 3 is a schematic representation of odd and even field pels of an image captured and displayed by the system of FIGS. 1 and 2.
Figure 4:
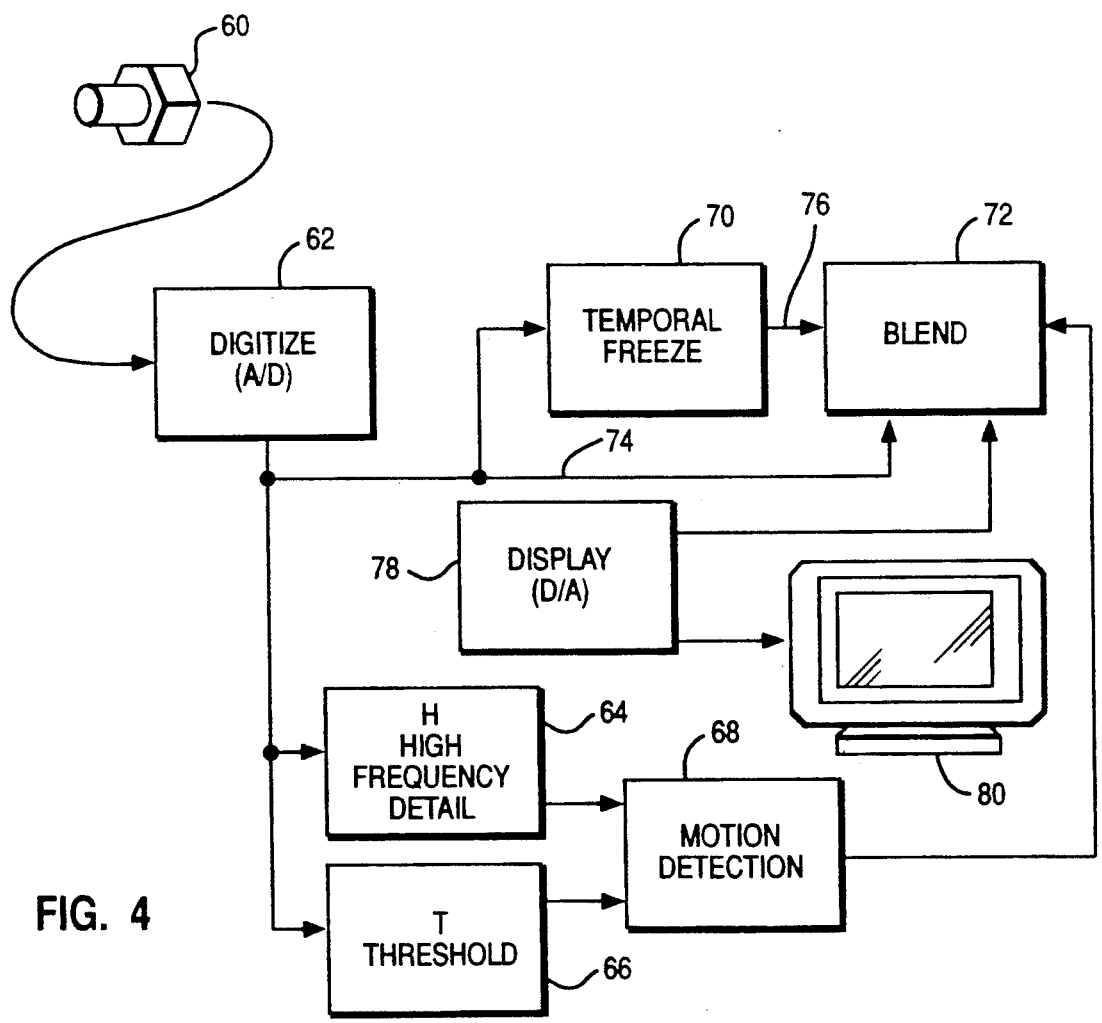
FIG. 4 is a flow diagram of the processing by the system of FIG. 1 of the image captured by the system to achieve interlace motion artifact elimination.

Now that a description of a capture system has been provided, a detailed description follows with reference to FIGS. 3 and 4 of the processing of these digital representations of capture pels by the processing application 49 in accordance with the invention.

It will be recalled that the system and method of the invention retains most of the resolution of a full interlaced image while eliminating the image shake of fast moving components. In a preferred embodiment this is accomplished in two steps. The first step identifies those areas of the image which are shaking or jittering, e.g. exhibiting undesirable noise motion, and the second step discards the second field in only those identified areas, substituting an estimate for pels in those areas based upon the other field. The resolution loss is thus confined to small areas that, because of rapid motion, were not sharply defined anyway.

Accordingly, in the first step of identifying areas which are shaking, it will be noted that such areas shaking due to motion have unique properties that identify them to the observer's eye which may also be identified by the computer system 10. In a shaking area, there is a large low spatial frequency difference between the two fields. This difference extends over a number of pels without changing sign.

The artifact most easily confused with shake is desirable high spatial frequency detail. Although this detail can produce a large difference between the two fields, the field difference is very rarely low spatial frequency, that is to say its sign and magnitude of this interfield difference change rapidly, particularly in the vertical direction. Also, detail at the highest spatial frequencies is almost always accompanied by detail at lower spatial frequencies. The higher spatial frequency detail of a single field is at half the highest frequency of the frame, and because it comes from a single field, it is uncorrupted by shake. Therefore this intrafield detail provides a threshold below which difference between the fields probably is interfield detail. Accordingly, to identify motion shaking, it is a feature of the invention to examine the digitized representations of the captured pels for interfield differences that extend vertically and coherently over several pels (i.e. that have low spatial frequency interfield differences), and that are larger in magnitude than intrafield detail in that area.

Referring to FIG. 3, in areas of motion, only pels relating to one field will be retained. This will be referred to as the first or even field comprised of even field pels 50, FIG. 3. The other field will be referred to as the second or odd field comprised of odd field pels 52. The method in accordance with the invention changes only the odd field, limiting the pels at which an operation may occur to half the total pels in the image. The process hereinbelow described is performed on every pel in this odd field. The result at each pel must not affect subsequent calculations. One way to accomplish this objective is to produce a second product image while working from an unchanged source image. However this would be inefficient because only rarely is a pel changed. Accordingly, an alternate method will be disclosed after the description of the general method with reference to FIGS. 3 and 4.

FIG. 3 depicts a schematic representation of a portion of pels comprising a captured image. It will be recalled that these pels will be comprised of two groups, first odd field pels 50 and a second collection of even field pels 54 interspersed or interlaced between the odd field pels. For illustrative purposes, particular ones of these pels have been accorded a notation such as pel 56 ($C_2$), the purpose of which will be hereinafter made clear and refers to a gray scale value of the particular pel.

A series of equations may be defined with respect to the even and odd field pels 50 and 52 as follows:

| | |
|---|---|
| $H_1 = A_1 - 2B_1 + 2C_1 - 2D_1 + E_1$ | Equation 1a |
| $H_2 = A_2 - 2B_2 + 2C_2 - 2D_2 + E_2$ | Equation 1b |
| $H_3 = A_3 - 2B_3 + 2C_3 - 2D_3 + E_3$ | Equation 1c |
| $T_1 = \|A_1 - 2C_1 + E_1\| + \|B_1 - D_1\|$ | Equation 2a |
| $T_2 = \|A_2 - 2C_2 + E_2\| + \|B_2 - D_2\|$ | Equation 2b |
| $T_3 = \|A_3 - 2C_3 + E_3\| + \|B_3 - D_3\|$ | Equation 2c |
| $H = \|H_1 + 2H_2 + H_3\|$ | Equation 3a |
| $T = T_1 + 2T_2 + T_3$ | Equation 3b |

In a preferred embodiment, several characteristics of the coefficient $C_2$ are desired and the value of $C_2$ will be set accordingly. First $C_2$ will remain unchanged if H divided by T is less than a selected first threshold. In the alternative, $C_2$ is assigned a value equal to the average of $B_2$ and $D_2$ if H divided by T is greater than a selected second threshold. Finally, $C_2$ is desirably set to a value between the above two cases of either remaining unchanged or assigned the average of $B_2$ and $D_2$ when H divided by T is between the two thresholds. It will be noted that the values of H from equations 1a-1c represent the high frequency interfield details extending over several pels vertically with the same phase. Values of T from equations 2a-2c represent the relative thresholds based on intrafield detail.

The first and second thresholds are set empirically. It is found assigning a first threshold value of 2 and a second threshold a value of 3 yields good results. If the thresholds are too high, some motion artifacts are not removed. If too law, some image detail is blurred.

The horizontal averaging in H and T reduce sensitivity to noise and to diagonal detail. Coefficients and ordering of absolute values are important for the described filter characteristics effected by the processing described with reference to FIGS. 3 and 4 in order to avoid noise and the like. Selection of such coefficients are made to accentuate the detection of the aforementioned characteristics of motion artifacts, while limiting computation complexity to reasonable levels.

Referring to FIG. 4, a detailed description follows of the flow diagram shown therein for processing pels in accordance with the invention. It will be appreciated that this flow diagram may readily be implemented in program code executable by the system 10 to achieve the herein described benefits of the invention, and that such code may be implemented in a number of manners readily apparent to one of ordinary skill in the art with reference to this figure.

The process is further described in the flow diagram of FIG. 4. A video camera 60 is connected to a video capture adapter 62 which captures two interlaced fields, each separated in time from the other, and together comprising a full frame. Block 64 examines this image for high spatial frequency detail that is a candidate for motion artifacts. The magnitude of this detail "H" is calculated using the equations presented above. Block 65 examines the image for middle frequency detail to determine a threshold of sensitivity to distinguish image detail from motion artifacts. The magnitude of the threshold "T" is calculated using the equations presented above.

Next, the high frequency detail is compared with the threshold in block 68 to determine for each segment of the captured image whether the area is corrupted by motion, and the degree of corruption.

Meanwhile, block 70 eliminates all motion artifacts from the image. In the preferred embodiment, this is accomplished by discarding one of the two fields captured by block 62, and substituting an estimate of that field based solely on the remaining field. This yields an image free of motion artifacts but with reduced resolution.

Next, a blending block 72 selects and blends between the original image on line 74 and the motion-free but reduced resolution image on line 76 under control of the output of the motion detection block 68. This selection and blending is articulated on an area-by-area basis. It may be appreciated that the temporal freeze function of block 70 need only operate on those areas selected by the motion detection of block 68, thereby saving computation time.

Finally, the resulting blended image output from block 72 may be acted on like any digital image. For example, it may be input to a display adapter 78 and viewed on a video display monitor 80.

The invention does not limit the temporal freeze block 70 to act by completely discarding one field, and admits to implementations wherein information in this field is utilized. For example, block 70 in some applications, would perform a cross-correlation on both fields with a plurality of offsets to determine magnitude of motion and then implement the temporal freeze function by blending both fields after one has been relatively offset in relation to the other by determined magnitude of motion.

A preferred process for operating on the values of the pels stored in the system 10 will now be described. As previously noted this process avoids producing a second product image while working from an unchanged source image, thereby saving memory since changed pels are generally far less numerous than those which remain unchanged.

As a representative example, it will first be assumed that an image has been calculated having a plurality of pels located, for convenience, by means of values in the X axis from 1 to 640 and in the Y axis from 1 to 480 with a first and second threshold having values of 2, and 3 for illustrative purposes.

For X values from 2 to 639 and Y values from 3 to 477, by steps of 2, a representative embodiment of the invention would first calculate H's and T's and store the result in a 238 by 638 matrix according to equations 1a-1c and 2a-2c.

Also for X values from 2 to 639 and Y from 3 to 477, by steps of 2, H's and T's would be calculated as well as X values defined by $$X = H - T - T \qquad \text{Equation 4}$$

If X is found to be equal to or less than 0, then the process will continue to the next pel and $$\text{pti } X = X - T \qquad \text{Equation 5}$$

If X is found to be greater than 0, then the pel which is being operated upon in accordance with the foregoing equations is replaced with an average of pels above and below. Otherwise, the pel is replaced with an average of itself and an average of pels above and below.

By precalculating H's and T's, the image may be modified in place, saving much time moving pels because the large majority of pels will not typically be changed. It will be noted also that H's and T's are calculated once per half of the pels and not three times. It will further be noted that the 238 by 638 matrices may be replaced if desired with two 3 by 638 matrices used repetitively for more efficiency.

It will thus be appreciated from the foregoing that in accordance with the invention, capture of a still image from an interlaced video source may thereby be enhanced to remove undesirable interlace motion artifacts. In such a system a first and second sequential field comprising a full frame are captured, and the digitized pels thence processed in these fields so as determine areas corrupted by fast movement. Finally, in these detected areas of fast movement, substitution for one field of pels is provided in accordance with the foregoing by values of pels for estimates based upon the other field.

While the invention has been shown and described with reference to particular embodiments thereof, it will be understood by those skilled in the art that the foregoing and other changes in form and detail may be made therein without departing from the spirit and scope of the invention.

I claim:

1. A method for improving digital video data of a target, comprising
    capturing said digital video image data in a plurality of fields;
    comparing interfield differences between said plurality of fields to intrafield pixel differences to detect in said digital video image data an area corresponding to motion of said target;
    deleting said image area from one of said fields; and
    substituting in said area of said one of said fields an image area functionally related to said image area from another of said fields.

2. The method of claim 1 further comprising
    generating a measurement of high frequency interfield detail between said plurality of fields;
    generating a measurement of relative threshold of intrafield detail as a function of pixels in one of a plurality of frames;
    establishing a first threshold; and
    leaving a pixel in one of said fields unchanged if said measurement of high frequency interfield detail is less than the product of said first threshold in said measurement of said relative threshold of intrafield detail.

3. The method of claim 2 wherein said measurement of high frequency interfield detail is derived from a plurality of vertically aligned adjacent pixels from said another of said fields.

4. The method of claim 3 wherein said measurement of high frequency interfield detail and said measurement of relative threshold of intrafield detail are each generated respectively from multiple adjacent horizontal pels.

* * * * *